United States Patent [19]
DeVries

[11] 3,767,230
[45] Oct. 23, 1973

[54] TRAILER POSITIONING AND MANEUVERING APPARATUS

[76] Inventor: Charles V. DeVries, 909 Serenity Dr., Plainfield, Ill. 60544

[22] Filed: Dec. 8, 1971

[21] Appl. No.: 205,946

[52] U.S. Cl.................................. 280/477, 254/166
[51] Int. Cl............................................. B60d 1/18
[58] Field of Search.................... 280/477, 478, 480, 280/479, 491 F; 114/235 WS; 254/166

[56] References Cited
UNITED STATES PATENTS
3,201,144  8/1965  Smyser................................ 280/477
3,043,259  7/1962  Sadler.......................... 114/235 WS FOREIGN PATENTS OR APPLICATIONS
435,415  9/1935  Great Britain...................... 280/480

Primary Examiner—Leo Friaglia
Attorney—Robert H. Heise

[57] ABSTRACT

An apparatus mountable on a front hitch of a trailer and operative for selectively applying combinations of lateral and upward forces to the hitch in a plurality of directions wherein maneuvers such as lifting, advancing and moving the trailer to various positions and attitudes can be accomplished.

8 Claims, 5 Drawing Figures

PATENTED OCT 23 1973  3,767,230
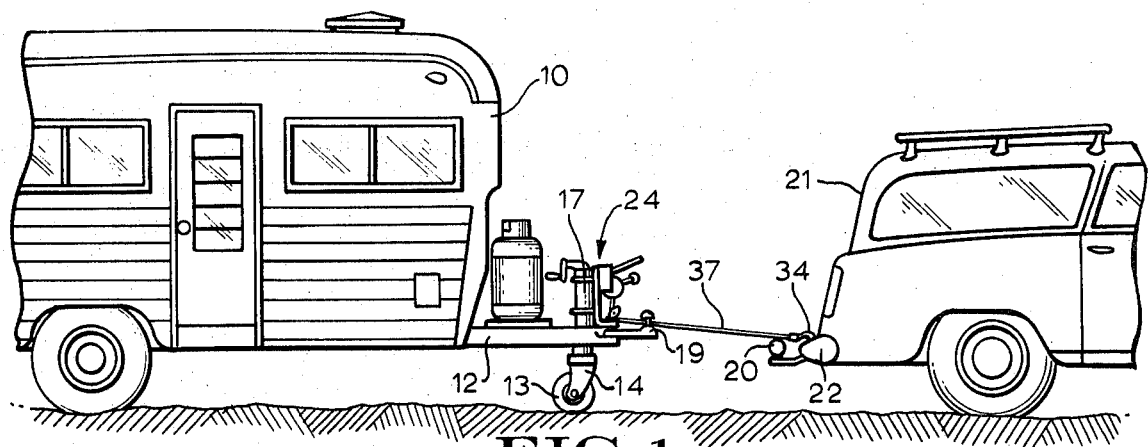
FIG. 1
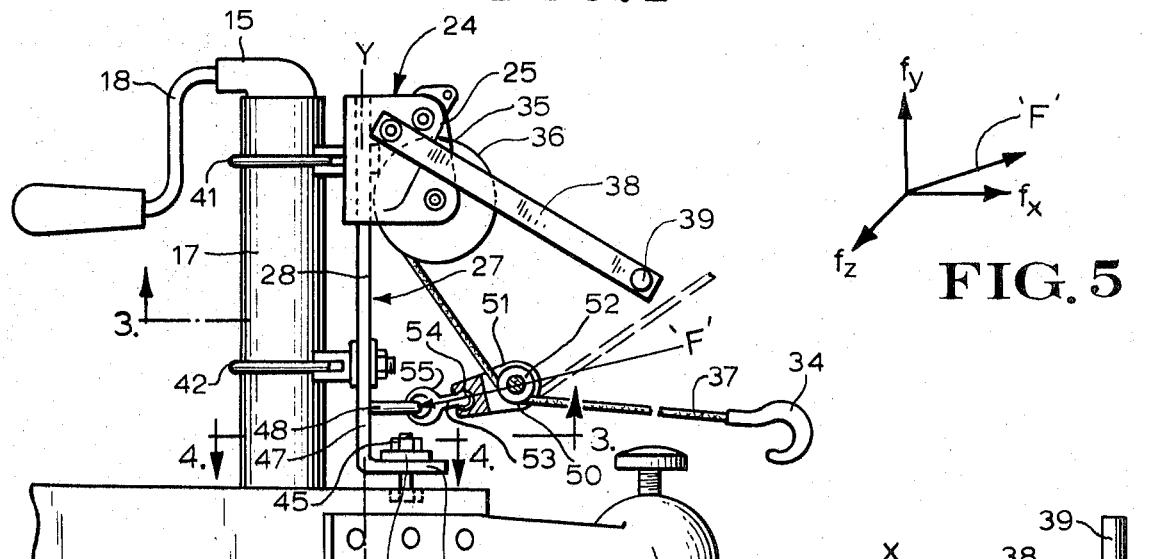
FIG. 2
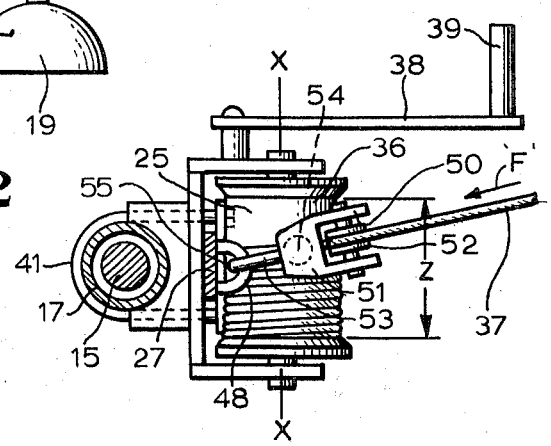
FIG. 3
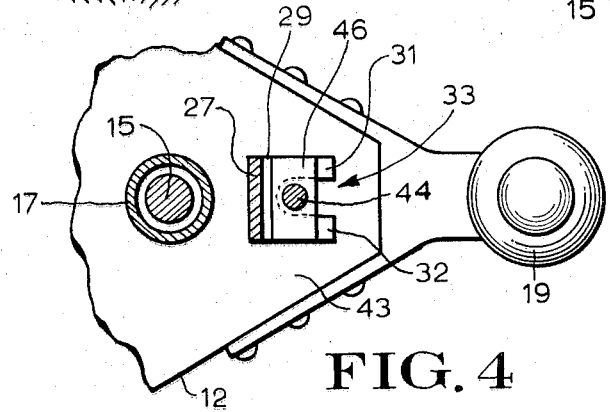
FIG. 4
FIG. 5

3,767,230

TRAILER POSITIONING AND MANEUVERING APPARATUS

BACKGROUND OF THE INVENTION

The trend toward mobility together with an ever increasing interest in camping has resulted in a phenominal number of travel trailers being produced and used by young and old for both year around living and recreation purposes. This type of trailer is necessarily large and heavy, and when transported to sundry locations and then parked under various conditions it could be expected that unique and unexpected problems will arise. Such may include maneuvering the trailer into a particular spot, positioning the trailer for reconnection to the tow vehicle, or possible extracting the forward supporting castor wheel thereof from soft ground such as loose sand or mud. A single occupant is also faced with the seemingly insurmountable problem of singularly aligning and positioning the trailer for hitching to a towing vehicle.

A principal object of the invention is to provide an apparatus for selective moving and positioning of a castor wheel supported trailer.

Another object of the invention is that the apparatus be producible of a plurality of differently directed forces which may be selectively applied to a hitch portion of the trailer.

Still another object of the invention is to provide that the apparatus be securable to an upright standard on the hitch portion, this member being disposed preferably near the distal end of the hitch in order that the aforementioned forces are applied at a near maximum spaced relation to the wheels of said trailer.

An object of the foregoing is that the apparatus be securable to that upright jack standard which houses a castor wheel commonly found on travel trailers.

A still further object of the invention is to provide that the apparatus include a winching mechanism having a cable reel from which cable can be payed out and then rewound with considerable mechanical advantage.

A contemplated object of the foregoing is to provide that the cable be trained about a pivot pulley swingably retained in cable feeding alignment with the reel, the pulley having a position of connection whereat the cable applies the various aforementioned directed forces to the hitch portion of the trailer by means of the pulley.

A specific object of the invention is to provide that the apparatus be adaptable for connection and use with a plurality of commercially available travel trailers.

The foregoing and other advantages and features of the invention will be apparent from the following more particular description of the preferred embodiments of the invention as illustrated in the accompanying drawings.

BRIEF DESCRIPTION OF THE DRAWINGS

FIG. 1 is an elevational view of a typical travel trailer showing the positioning and maneuvering apparatus mounted thereon;

FIG. 2 is an enlarged elevational view particularly showing the apparatus;

FIG. 3 is a view taken substantially at line 3—3 of FIG. 2;

FIG. 4 is a view taken substantially at line 4—4 of FIG. 2; and

FIG. 5 is a vector diagram of exemplarly forces produced by the apparatus.

DESCRIPTION OF THE PREFERRED EMBODIMENT

Turning attention to FIG. 1, a typical travel trailer 10 having an A-frame hitch 12 extending from the forward portion thereof. The trailer 10 is shown in a parked position with the forward portion thereof being supported by a ground engaging castor wheel 13 journaled on a carriage 14. The carriage 14 is swivelably connected to a jack, indicated at 15, which is housed in an upright standard 17. A jack handle 18 is operative, upon cranking, to raise or lower a hitch socket 19 secured to the forward distal end of the A-frame hitch 12. This is to provide that a proper height may be attained to effect connection of the hitch 12 to a ball hitch 20 secured to a towing vehicle 21. The jack 15 is also utilized to level the trailer 10 during use.

As best seen in FIG. 2, the instant invention, as embodied in a positioning and maneuvering apparatus, generally designated 24, is shown secured to the upright jack standard 17, which is typically located on the A-frame hitch 12. It is pointed out that the standard 17 is a conveniently positioned member commonly found on travel trailers and is therefore utilized as demonstrated in the figures. However, other similarly located members could also serve as a mount for the apparatus 24 if, perchance, a standard such as indicated at 17 was not available.

The apparatus 24 comprises a winch 25 and pivot pulley 50 connected to mounting means comprising a heavy, elongated mounting member 27 defining a longitudinal axis Y—Y thereof. The member 27 comprises a shank 28 with a foot 29 disposed at one end thereof in substantial normal orientation to the longitudinal extent of the shank 28. The foot 29 is bifurcated along a substantial portion of its length to form legs 31 and 32 flanking a centrally disposed slot 33.

The winch 25 comprises a housing 35 onto which is journaled a drum or cable reel 36 having an axis rotation X—X. The reel 35 is operatively connected to an associated winching mechanism (not illustrated) of the winch 25 by which the winch is operative for selectively paying out a cable 37 or winding it onto the reel. A cable 37 is provided and has one end thereof secured to the drum 36 with the free end having a hook 34 connected thereto. The winching mechanism suggested to the instant invention is of the mechanical type well known to those skilled in the art and is crank operated in a usual manner. In conjunction with this mechanism the winch 25 includes an arm 38 and handle 39 operative of the mechanism wherein substantial mechanical advantage in winding the cable 37 onto the drum 36 is effected. It is contemplated that power winches, such as an electric type, could be also used in lieu of the mechanical type suggested.

Mounting means are utilized for securing the member 27 to the standard 17. These means include U-bolt assemblies 41 and 42 by which the apparatus 24 is mounted in position. It can be seen that the U-bolt assemblies (41, 42) are spaced apart on the standard 17 and the shank 28. The slot 33 of the foot 29 receives an upward protruding bolt 44 from a plate 43 onto which the standard 17 is affixed. The foot 29 of mounting member 27 is firmly secured to the plate 43 by the bolt 44 through a nut 45 and washer 46 spanning the legs 31, 32. It can be seen in FIG. 2 that the U-bolt assembly 42 and the securing of foot 29 define a lower shank portion 27 of the member 27 which is firmly secured to the hitch 12. Force transfer means comprising a U-shaped member or loop 48 is securely welded to the lower shank portion 47 directly below the drum 36 of the winch 25. As best seen in FIG. 3 the loop 48 is disposed on the axis Y—Y of member 27 and is also centrally located with respect to the cable reeling extent of the reel 36 while being positioned to one side of the reel 36 in approximate alignment with the periphery thereof.

The pivot pulley 50 is swingably disposed in cable feeding relation to the drum 36. The pulley 50 comprises a body 51 which rotatably retains a sheave 52 and a swivel connecting link 53. The swivel link 53 terminates at one end in a spherical knob 54 which is swivelably retained in the body 51 in substantial alignment with the sheave 52. The other end of the connecting member 53 comprises a ring 55 which is linked with the loop 48. This combination of a swivelable and swingable connection is an important and novel feature of the instant invention, for it can be seen (FIG. 3) that the pivot pulley 50 is swingably retained such that the travel of that portion of the body 51 through which the cable 37 passes while in engagement and trained on the sheave 52 is restricted to swing back and forth substantially within the longitudinal extent, designated Z, of the drum 36. Furthermore the swivel action of body 51, due to the spherical knob 54, in cooperation with the swinging feature of the connection of the link to the loop 48 assures proper cable feeding onto the drum notwithstanding the direction of the free end cable leaving pivot pulley 50. It can be appreciated that by swingingly connecting and retaining the pivot pulley 50 in cable feeding relation to the drum 36 and at the same time providing that the pulley 30 be able to rotate and pivot relative to that connection, that a wide range of directions and angles of the cable 37 and attendant forces can be selected while yet assuring the cable 37 will pay onto the drum properly. For as various cable 37 directions are chosen to either lift, advance or move the trailer 10 in any combination of the foregoing directions, the pivot pulley 50 will apply an attendant pulling force to the lower shank portion 47 of the mounting member 27 through the loop or member 48 while simultaneously maintaining the cable 37 in a proper feeding relationship to the drum 36. The direction of this force is dictated by the direction of the cable 37.

In operation, a typical problem may be illustrated, take for example a situation where the castor wheel 13 has sunk into soft ground and it is desired that the hitch 12 and the trailer 10 be advanced and also pivoted laterally in order that alignment with the towing vehicle 21 may be accomplished. First, the mechanism of the winch 25 is released and the cable 37 is payed out and connected about a stationery reactive member, for example a pole or tree, in this example the free end of the cable 37 should be secured such that an upward direction which angles forwardly and laterally of the trailer 10 is effected. As the winch 25 is operated to rewind the cable 37 a tension force will be produced therein thereby subjecting and imparting a resultant pulley force 'F' to the pivot pulley 50. The pulley 50 will self-position itself in relation to the stationary member and the trailer's (10) location thereto, and the desired pulling force 'F', having a direction dictated by the cable 37, will be transmitted to the loop 48 by the link 53. This force will be transferred at substantially the same direction to the mounting member 27 and thereby to the A-frame hitch 12. FIG. 5 illustrates a vector diagram of the force 'F'. It can be seen vectors indicating component forces $fx$, $fy$ and $fz$ of 'F' are applied to hitch 12 by the foresaid operation of the winch to effect upward, forward and lateral movements to the hitch 12. Furthermore the swinging connection of the pulley 50 to the loop 48 together with the pivotal connection of the swivel member 53 to the body 51 of the pulley continually maintain alignment with the cable 37 with the drum 36 as the trailer moves upwardly, forwardly and laterally. It can be appreciated that as the trailer 10 moves, the cable 37 necessarily changes relative angular relation to the apparatus 24 causing a relative change of direction of the cable 37 relative to the apparatus. This change is automatically compensated for because of the self aligning feature of the pivot pulley 50 in cooperation with the loop member 48 together with their dispositional relationship relative to the reel 36.

Another example is suggested in FIG. 1 where a single occupant need advance and also move the trailer hitch 12 laterally and thereby draw it to the towing vehicle 21 for connection thereto. Here the cable 37 is payed out and the hook 34 on the free end thereof is secured to the rear bumper 22 of the vehicle 21. Here again the pulley 50 will self position itself for proper rewind winching operation and the desired connection to the towing vehicle can be accomplished by a person without the necessity of directions by another person. It can be appreciated that the only alternative if one was alone would be blindly trying to back the towing vehicle 21 into exact position for hitch connection. At best, a very difficult task. It is not difficult to imagine numerous other applications and problems the instant invention could be successfully applied.

It will be appreciated that the embodiment of the invention chosen for the purposes of illustration and description herein is that preferred base upon requirements for achieving the objects of the invention and developing the utility thereof in the most desirable manner, due regard being had to existing factors of economy, simplicity of design and construction, production methods and the improvements sought to be effected. It will be understood, that the particular structure and functional aspect emphasized herein are not intended to exclude but rather to suggest such other modifications and adaptations as fall within the spirit and scope of the invention as hereinbefore described.

What is claimed is:

1. An apparatus mountable on a hitch of a trailer and operative for selectively moving and maneuvering the same, said apparatus comprising:

mounting means connectable to said hitch;

winch means disposed on said mounting means, said means comprising a cable reel and a cable having one end connected to said reel, said means operative to pay out and wind said cable on said reel;

a pivot pulley disposed on said mounting means in aligned relation to said drum, said pulley comprising a sheave operative to train said cable and pivot means for providing pivotal movement of said sheave relative to said mounting means;

force transfer means for swingably retaining said pulley to said mounting means in cable feeding relation to said reel, and operative to transfer to said mounting means those angularly directed pulling forces imparted to said pulley by said cable at the angles of direction dictated by said cable; and whereupon rewinding of said reel said pivot means of said pulley and transfer means being cooperatively operative to self align said sheave in cable feeding relation to said reel and transfer the pulling forces to the mounting means at said direction dictated by said cable upon the free end of said cable being payed out and connected to objects apart and remote from said trailer whereby moving and maneuvering of said trailer is effected.

2. The invention as recited in claim 1 wherein said mounting means comprises a mounting member having an elongated extent defining a longitudinal axis thereof, said cable reel having a longitudinal extent rotatable about an axis of rotation, and said force transfer means disposed on said mounting member along the longitudinal axis thereof and in spaced relation and intermediate to said longitudinal extent of said reel.

3. The invention as recited in claim 2 wherein said pivot pulley comprises a body in which said sheave is journaled, and said pivot means comprising a connecting link providing a pivotal interconnection between said body and said force transfer means, said connection in substantial alignment with the plane of rotation of said sheave.

4. The invention as recited in claim 3 wherein said winch means comprises a manually operated winch having an external arm and handle for operation thereof.

5. The invention as recited in claim 3 wherein said power transfer means comprises a U-shaped member secured to said mounting member to form a closed loop therewith, and said connecting link of said pivot pulley including an annular portion swingably disposed in linked relation to said U-shaped member.

6. The invention as recited in claim 5 wherein said mounting member includes a foot portion having a perpendicular angulated relation to said member and disposed at one end thereof, and said U-shaped member disposed between said winch means and said foot portion, said foot portion having an aperture to facilitate securing that end of the mounting member to said hitch.

7. The invention as recited in claim 5 wherein said mounting mean comprises at least two U-shaped bolt assemblies operative to secure said mounting member to said hitch.

8. An apparatus mountable on an upwardly extending member on a hitch of a trailer, the apparatus comprising:

winch means disposable on said member and comprising a cable drum having a longitudinal cable reeling extent and a cable, said means operative to payout and wind a free end of said cable along said extent:

a pivot pulley disposed on said member in aligned relation to said drum, said pulley comprising a sheave operative to train said cable and pivot means for providing pivotal movement of said sheave relative to said member;

force transfer means for swingably retaining said pulley to said member in cable feeding relation to said reel, said force transfer means comprising a pivot member securable on said member on said hitch, and said pivot pulley including a link providing swivel connection to said pulley at one end thereof, the other end of said link swingably secured to said pivot member to permit a plurality of angular attitudes of said pivot pulley relative to said hitch member while maintaining a cable feeding relation to said cable reeling extent.

* * * * *